US009497517B2

(12) United States Patent
Lea (10) Patent No.: US 9,497,517 B2
(45) Date of Patent: Nov. 15, 2016

(54) ASA: A SCALABLE OPTICAL SWITCH (71) Applicant: Chin-Tau Lea, Ma On Shan (HK)

(72) Inventor: Chin-Tau Lea, Ma On Shan (HK)

(*) Notice: Subject to any disclaimer, the term of this patent is extended or adjusted under 35 U.S.C. 154(b) by 0 days.

(21) Appl. No.: 14/530,695

(22) Filed: Nov. 1, 2014

(65) Prior Publication Data
US 2016/0127810 A1  May 5, 2016

(51) Int. Cl.
*H04Q 11/00* (2006.01)
*H04J 14/02* (2006.01)

(52) U.S. Cl.
CPC .......... *H04Q 11/0003* (2013.01); *H04J 14/02* (2013.01); *H04Q 2011/0024* (2013.01); *H04Q 2011/0032* (2013.01); *H04Q 2011/0039* (2013.01); *H04Q 2011/0064* (2013.01)

(58) Field of Classification Search
CPC .......... H04Q 11/0003; H04Q 2011/0024; H04Q 2011/0039; H04Q 2011/0064; H04Q 2011/0032; H04Q 11/003; H04J 14/02
See application file for complete search history.

(56) References Cited

U.S. PATENT DOCUMENTS

| | | | | |
|---|---|---|---|---|
| 6,271,949 B1 * | 8/2001 | Suemura | ............... | H04J 14/02 398/9 |
| 6,567,429 B1 * | 5/2003 | DeMartino | ........... | H04J 14/02 370/395.64 |
| 6,920,135 B1 * | 7/2005 | Lea | ................ | H04L 49/1507 370/389 |
| 7,426,210 B1 * | 9/2008 | Miles | ............. | H04J 14/0223 370/400 |
| 7,430,346 B2 * | 9/2008 | Jennen | ............ | G02B 6/12021 385/17 |
| 8,792,787 B1 | 7/2014 | Zhao | | |
| 2002/0181067 A1 * | 12/2002 | Romanovsky | ..... | H04Q 11/0003 359/245 |
| 2003/0193937 A1 * | 10/2003 | Beshai | ........... | H04Q 11/0005 370/372 |
| 2013/0121695 A1 | 5/2013 | Bernasconi | | |
| 2014/0178068 A1 * | 6/2014 | Sato | ............... | H04Q 11/0005 398/46 |
| 2015/0312657 A1 * | 10/2015 | Yan | ............... | H04Q 11/0005 398/48 |

FOREIGN PATENT DOCUMENTS

EP  1 162 860 A2  12/2001

* cited by examiner

*Primary Examiner* — Leslie Pascal (57) ABSTRACT

A scalable AWGR-based optical switching fabric and its scheduling method are presented. The switching fabric consists of three stages: two stages (first and third) of AWGRs interconnected by a second stage of optical space switches. The optical switching system is named ASA for the technologies used to construct the three stages: AWGR, Space switching, and AWGR. The first stage and third stage portions of the switching fabric comprise up to N N×N AWGRs (N inputs and N outputs) and the middle stage N N×N optical space switches, wherein N is an odd integer. This makes the switch's total port count $N^2$. Each port can transmit up to N packets of different wavelengths simultaneously. Thus the total capacity of the switch is around ($N^3$×bandwidth of one wavelength channel).

12 Claims, 11 Drawing Sheets

Figure 1

$\lambda_m^n$: wavelength $m$ at input $n$

ASA: A SCALABLE OPTICAL SWITCH

RELATED APPLICATION

This patent application claims priority to U.S. Provisional Patent Application No. 61/946,856, filed on Mar. 2, 2014, entitled "ASA: A SCALABLE OPTICAL SWITCH", the entirety of which is incorporated herein by reference.

TECHNICAL FIELD

The invention relates generally to optical switching systems and methods, and in particular, scalable AWGR-based optical switching systems and architectures.

BACKGROUND

The Internet's traffic growth shows no sign of abating. To keep pace with the growth, the capacity of a single-rack rooter has grown about threefold every 18 months. But the energy-per-bit efficiency has only decreased at a rate of about 10% per year since 2000. Since the power dissipation within a rack cannot substantially increase due to the present limitations of air cooling, the energy-per-bit efficiency will quickly become the ultimate capacity limiting factor for future routers and data center networks.

People have turned to optics for solutions. Photons as an information carrier are much more power efficient than electrons. Parallel VCSEL (vertical-cavity surface-emitting laser) links have already been deployed for board-to-board and rack-to-rack communications. The problem mainly lies in switching. Take the interconnect system, of a data center network for example. It usually contains two or three tiers and electronic switching is performed in each tier. This interconnect architecture introduces as many as six O/E and E/O conversions and these conversions consume a large amount of power. As a result, they greatly diminish photonics' potential to improve the energy-per-bit efficiency in data center networks.

If the interconnect of a data center network can be implemented with optics, the E/O and O/E conversions inside the switch will disappear and tremendous power saving can be achieved. AWGRs (Arrayed Wavelength Grating Router) offer a promising solution. An AWGR is a passive device and consumes almost no power. Using diffraction grating, an AWGR routes optical signals based on their wavelengths and $N^2$ flows can traverse the device simultaneously (N is the port count and also the number of wavelengths). In contrast, only N flows can pass through an N×N electronic crossbar at any given time.

Although AWGRs have become the center piece of many optical interconnect proposals, this technology has one fundamental limitation: poor scalability. To increase the port count of an AWGR, we have to increase the number of wavelength channels by reducing channel spacing. Unfortunately, this will lead to higher channel crosstalk. A realistic port count for an AWGR is likely less than fifty. A large data center network, however, may need to interconnect a thousand racks, or more. Solving the scalability issue has become a prerequisite for using the AWGR technology for large routers or data center networks.

SUMMARY

The following discloses a summary of the invention of a three-stage optical packet switching system that addresses the lack of scalability of AWGR-based switching fabrics in prior art. The disclosed switching system comprises an optical switching fabric and an electronic scheduler. The switching fabric comprises three switching stages; first, second (middle) and third. The first stage and third stage portions of the switching fabric comprise a plurality of N×N (N inputs and N outputs) AWGRs (arrayed waveguide grating routers), which are interconnected by a middle stage of N N×N optical space switches, where N is an odd integer. The optical switching system is called ASA for the technologies (i.e. AWGR-Space Switches-AWGRs) used in the three stages mentioned, above. The maximum number of AWGRs in the first or third stage is N. Hence, the maximum port count of the switching system is $N^2$. Each port can send up to N packets of different wavelengths simultaneously. This makes the total bandwidth of the switching system ($N^3$×bandwidth of each wavelength channel). Another important feature of the presented system is that it does not use expensive wavelength converters.

The electronic scheduler contains two stages, first and second, of electronic scheduling devices. The first-stage scheduling devices merely distributes request tokens (i.e. short control packets) received from input ports to the second scheduling stage. The scheduling devices of the second scheduling stage perform scheduling functions and use the scheduling results to configure the space switches in the optical switching fabric. Although there are $N^2$ ports in the presented optical switching system, the matching function performed by each scheduling device of the second stage is for interconnecting AWGRs of the first and the third stages. Thus the complexity of the scheduling algorithm has the order O(N), not $O(N^2)$.

DETAILED DESCRIPTION

The subject innovation presents architectures and methods relating to the construction of scalable AWGR-based optical switches.

Figure 1:
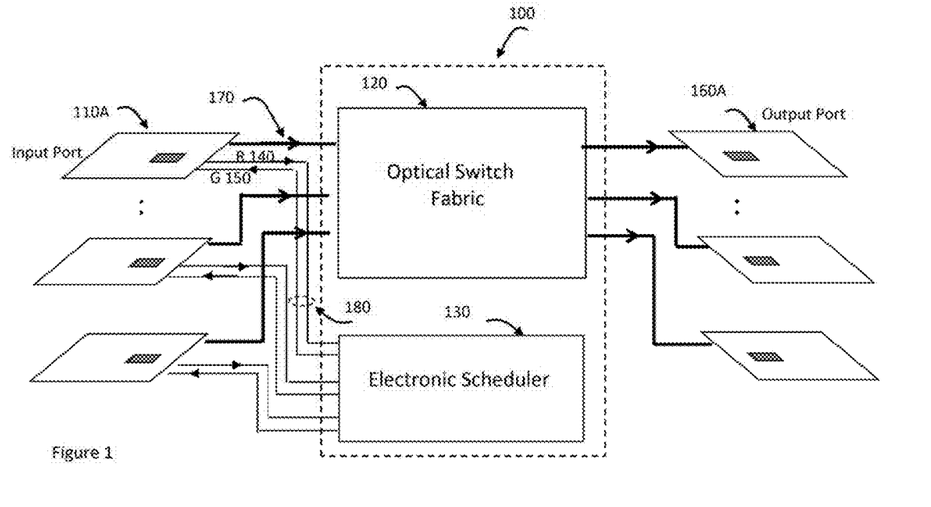
FIG. 1 is an exemplary optical switching system with an optical switching fabric and an electronic scheduler.

A switching system (e.g 100) provides the interconnection function between a plurality of input ports (e.g. 110A) and a plurality of output ports (e.g. 160 A). An incoming data packet is usually divided ('chopped') into fixed-length cells (i.e short packets) at input ports before they are sent to the switching fabric. The various exemplary embodiments of the invention presented herein operate in a 'cell mode' (i.e., all data packets being transmitted through the switching fabric have the same packet length), while the terms 'packet', 'data packet', and 'cell' are used interchangeably herein.

An optical switching system (e.g. 100) as described in this invention is further divided into two major components; an optical switching fabric (i.e. 120) and an electronic scheduler (i.e. 130). Before an input port (e.g., 110A) sends a cell to an output port (e.g, 160 A), it sends a request token (e.g. R140) to the scheduler (i.e. 130). A grant token (e.g., G150) is returned later by the scheduler after scheduling is performed, in the present invention, the switching fabric 120 is implemented, with optics and the scheduler 130 is implemented with electronics. Since the amount of control traffic (i.e. request tokens and grant tokens) is much smaller than the amount of data traffic, the electronic implementation of the scheduler will not degrade the energy-per-bit efficiency of the entire switch.

Figure 5:
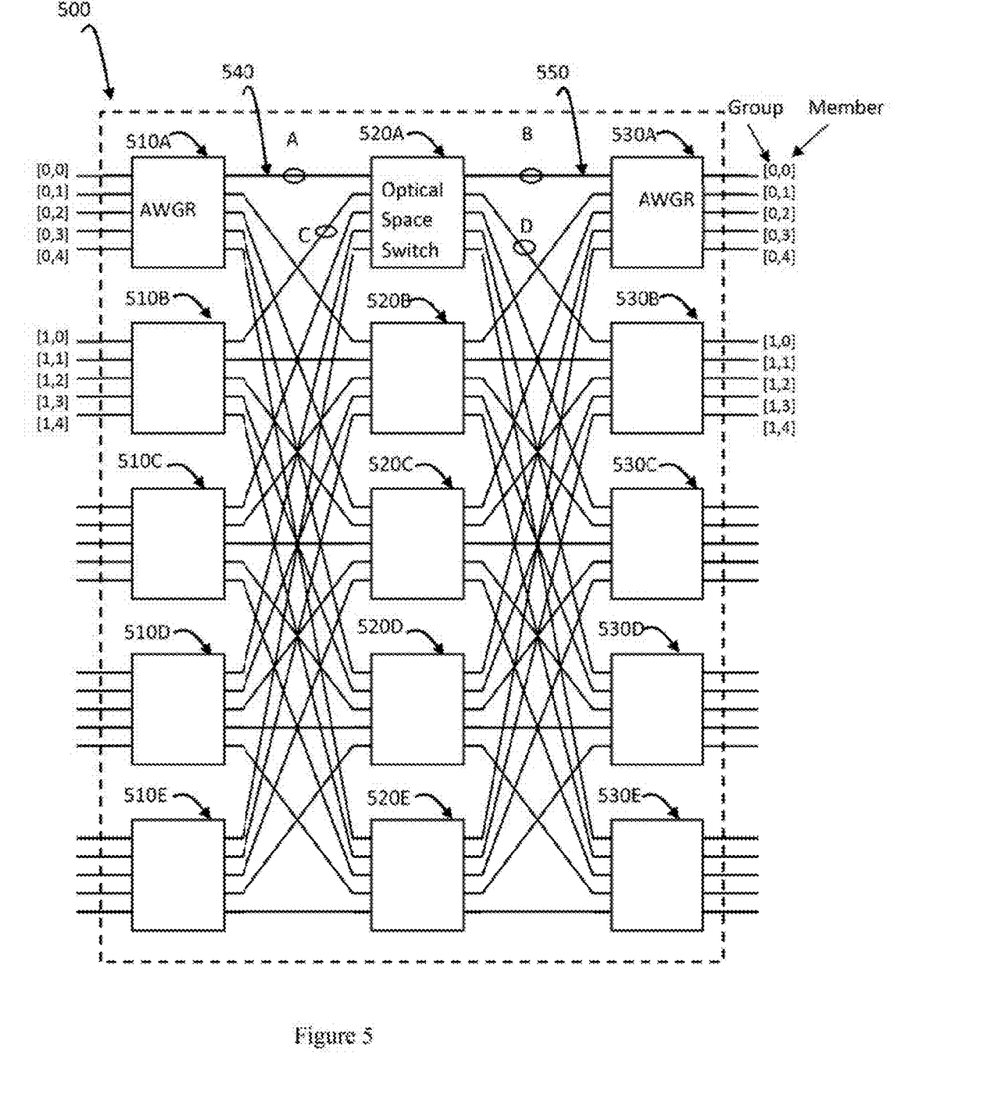
FIG. 5 is an exemplary embodiment of the optical switching fabric of the invention. The first and the third stage are constructed with N N×N AWGRs and the middle-stage with N N×N optical space switches, where N is an odd integer.

The optical switching fabric comprises a first stage of multiple N×N (N inputs and N outputs) AWGRs (e.g. 510A-E), where N is an odd integer, a third stage of multiple N×N AWGRs (e.g 530A-E), and a second stage of N N×N optical space switches (520A-E). The maximum number of AWGRs in the first and third stages is N. This makes the total number of ports of the switching fabric $N^2$.

The Optical Switching Fabric

Figure 2A:
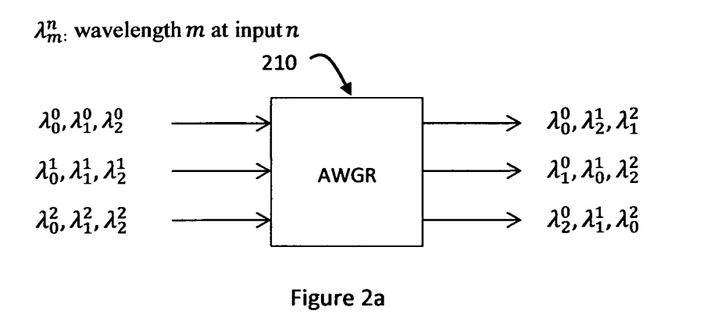
FIG. 2a is diagram illustrating $N^2$ flows that can pass through an N×N AWGR.

A flow in our description below refers to the traffic between a pair of input-port/output-port. By this definition, there are $N^2$ different flows that can exist in an N-port switching system or device. An N-port AWGR (e.g. 210) operates on a set of N wavelengths $\{\lambda_0, \lambda_1, \ldots, \lambda_{N-1}\}$. A flow in such a device can be categorized by a three-tuple (i,w,o), where i denotes the input, w the wavelength used by the flow, and o the output. The relationship among the three parameters in (i,w,o) is given below:

$$o=(i+w) \bmod N. \qquad (1)$$

An AWGR is a passive device and cannot be configured. Given the input of a flow, its output is uniquely determined, by the wavelength of the flow (see (1)). Thus routing in an AWGR is called wavelength routing in our discussion below.

Figure 2B:
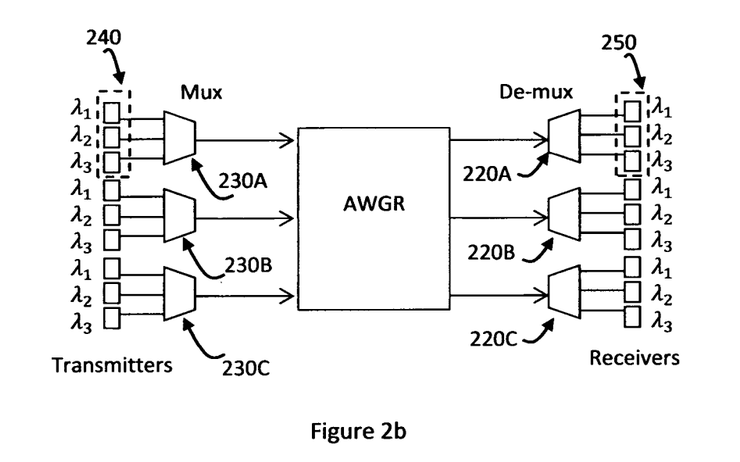
FIG. 2b is a diagram illustrating a design where a transmitter has N non-tunable lasers.

Based on the definition of a flow, we can define $N^2$ flows for an N-port AWGR. These $N^2$ flows can traverse the device simultaneously (FIG. 2a) without blocking each other. The transmitter and receiver configurations for supporting $N^2$ flows are shown in FIG. 2b, where each input port is equipped, with N transmitters (e.g. 240) using different wavelengths. The wavelength of each transmitter is fixed and tunability is not needed in this design. Nor is scheduling required because flows destined for the same output port will use different wavelengths and can be accepted simultaneously by the receiver, which consists of a wavelength demux (e.g. 220A) and an array of N receivers (e.g. 250).

A Two-Stage Fabric

Figure 3:
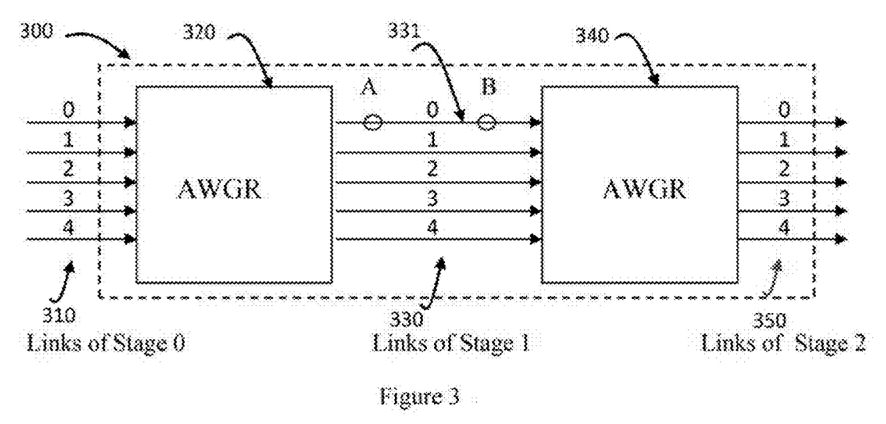
FIG. 3 is a two-stage AWGR-based network, where N, the number of wavelengths of the AWGR, is an odd integer.

Although the present invention consists of three stages, its design principle is based on a two-stage network shown in FIG. 3. Switch 300 is made from a cascade of two AWGRs 320 and 340. Each flow in the two-stage network is still characterized by a three-tuple (i,w,o). The relationship among the three parameters is now governed by $$o=(i+2w) \bmod N \qquad (2)$$

Due to the term 2w in (2), the two-stage network is no longer nonblocking: two flows using the same wavelength may collide at a link of stage-1 (e.g. 330) or a link of stage-2 (e.g. output link 350). In other words, the network in FIG. 3 cannot support $N^2$ flows simultaneously. But as shown in the properties below, the network can still support $N^2$ flows if N is odd.

Property 1. Assume N is odd in the two-stage network in FIG. 3. Given any two parameters in the three-tuple (i,w,o) of a flow, the other parameter can be uniquely determined.

Proof. Let $(i_1,w_1,o_1)$ and $(i_2,w_2,o_2)$ be two flows in the network of FIG. 3. We have $o_1=(i_1+2w_1) \bmod N$, and $o_2=(i_2+2w_2) \bmod N$. Let $i_1=i_2$ and $o_1=o_2$. This leads to $$2(w_1-w_2) \bmod N = 0.$$

Since N is odd, the above equation will hold only if $w_1=w_2$. Thus w can be uniquely determined by i and o. Similarly, we can show that o (or w) can be uniquely determined if i and w (or i and o) are specified. ∎

By Property 1, we can use (i, *, o), (i, w, *), or (*, w, o) to describe a flow because the unspecified parameter, denoted by *, can be uniquely determined from the other two parameters.

Property 2. Assume AGs odd in the two-stage network in FIG. 3. All $N^2$ flows can traverse the network, simultaneously without blocking.

Proof. We prove this property by showing (i) an input port can reach all output ports, and (ii) two different flows using the same wavelength will not travel through the same link in the network.

Proof of (i): Property 1 shows that (i, $w_1$, *) and (i, $w_2$, *) will reach different output ports if $w_1 \neq w_2$. Thus an input can reach all outputs if it uses N different wavelengths.

Proof of (ii): Consider two different flows $(i_1, *, o_1)$ and $(i_2, *, o_2)$. Assume the two flows use the same wavelength, i.e. $w_1=w_2$. Property 1 indicates that $i_1 \neq i_2$ and $o_1 \neq o_2$ must hold. Thus the two flows will not block each other at an output link. Since $i_1 \neq i_2$, Eq. (1) implies that they will travel through different links of stage 1. Thus no blocking can occur inside the two-stage network. ∎

An example of N=5 is given below where flows, specified by (i,w,*), passing through links 330 of stage-1 and links 350 of stage-2 are given below.

Stage 1:
line 0 (0, 0,*)(4, 1,*)(3, 2,*)(2, 3,*)(1, 4,*)
line 1 (1, 0,*)(0, 1,*)(4, 2,*)(3, 3,*)(2, 4,*)

line 2 (2, 0,*)(1, 1,*)(0, 2,*)(4, 3,*)(3, 4,*)
line 3 (3, 0,*)(2, 1,*)(0, 2,*)(0, 3,*)(4, 4,*)
line 4 (4, 0,*)(3, 1,*)(2, 2,*)(1, 3,*)(0, 4,*)
Stage 2:
line 0 (0, 0,*)(3, 1,*)(1, 2,*)(4, 3,*)(2, 4,*)
line 1 (1, 0,*)(4, 1,*)(2, 2,*)(0, 3,*)(3, 4,*)
line 2 (2, 0,*)(0, 1,*)(3, 2,*)(1, 3,*)(4, 4,*)
line 3 (3, 0,*)(1, 1,*)(4, 2,*)(2, 3,*)(0, 4,*)
line 4 (4, 0,*)(2, 1,*)(0, 2,*)(3, 3,*)(1, 4,*)

Figure 4:
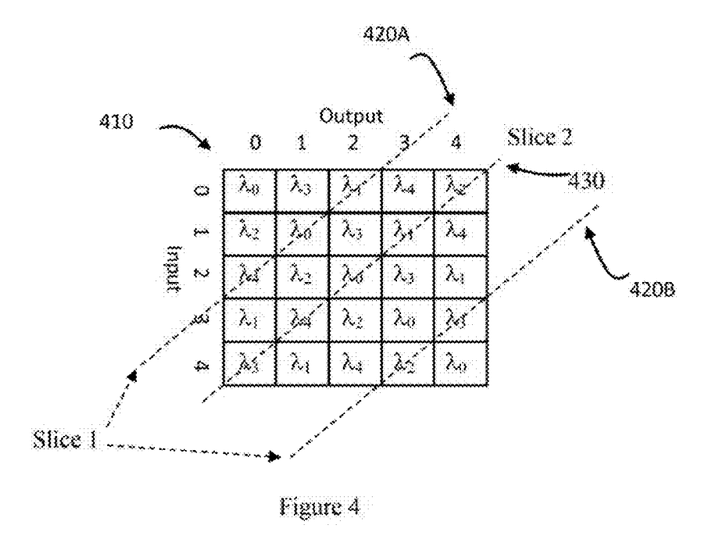
FIG. 4 is a diagram to show that the $N^2$ flows of the two-stage network in FIG. 3 can be divided into N slices.

In general, these $N^2$ flows can be divided into N slices, numbered from 0 to N−1, and each slice is defined to be the set of flows passing through the same link in link stage 1 (see FIG. 4). As far as the first AWGR is concerned, the jth slice comprises flows departing from its jth output link (like point A). Which means slice m contains all flows (i,w,*) satisfying $$sn=(i+w)\bmod N. \quad (3a)$$

For example, slice 1 contains flows (1, 0,*)(0, 1,*)(4, 2,*)(3, 3,*)(2, 4,*). As far as the second AWGR is concerned, the jth slice comprises flows arriving from its jth input link (like point B). Thus slice sn contains all flows (*,w,o) satisfying $$sn=(o-w)\bmod N. \quad (3b)$$

The flows of slice 1 can also be written as (*, 4, 0), (*, 0, 1), (*, 1, 2), (*, 2, 3), (*, 3,4).

Property 3. Assume N is odd in the two-stage network in FIG. 3. All flows of a slice will use different wavelengths. Proof. If two flows of a slice use the same wavelength, one of them will be blocked as they pass through the same link. This is a violation of Property 2. ∎

Finally, we have the following property which shows that two different flows destined for the same output port must belong to two different slices.

Property 4. Consider two different flows $(i_1,*,o_1)$ and $(i_2,*,o_2)$. If $o_1=o_1$, then the two flows belong to two different slices.

Proof. The condition of $o_1=o_2$ means $(i_1+2w_1)\bmod N=(i_2+2w_2)\bmod N$. In other words, $((i_1+w_1)+w_1)\bmod N=((i_1+w_2)+w_2)$. The condition $o_1=o_2$ also means $w_1\neq w_2$ (Property 2). We have therefore $(i_1+w_1)\bmod N\neq(i_1+w_2)\bmod N$. Thus the slice numbers (i.e. $(i_1+w_1)$ and $(i_1+w_2)$) of the two flows are different. ∎

The Three-Stage Optical Switching Fabric

FIG. 5 depicts an embodiment of an ASA switching fabric (i.e. 500). There are N N×N AWGRs in the first and the third stage (i.e. 510A-E and 530A-E), and N N×N space switches in the middle stage (e.g. 520A-E). Note that N must be odd (N=5 in FIG. 5). LiNbO₃-based directional couplers or optical MEMS devices can be used to construct the space switches. Each input port can transmit wavelengths and the entire switch can support up to $N^3$ traversing flows simultaneously. How this is achieved is described below The address of an input (or output) port in an ASA switch is represented by a two-tuple [group, member], where group refers to the AWGR and member refers to the link of the AWGR to which the input (output) port is attached (see FIG. 5). In an ASA switch, we ignore the group field and use only the member field for wavelength routing in AWGRs of stage 1 and 3.

This means that for flow $([g_s, m_s], *, [g_d, m_d])$, we can use $m_s$, $m_d$, and (2) to compute the wavelength w of this flow:

$$m_d=(m_s+2w)\bmod N. \quad (4)$$

Given its wavelength, the routing of a flow in the AWGRs of stage 1 and stage 3 is fixed and done in the same way as the routing is done in the two-stage network in FIG. 3. For example, flow $([s_0,0], *, [d_0,0])$ in FIG. 5 is similar to flow (0,*,0) in the two-stage network in FIG. 3: both use the same wavelength (which can be determined by (2)) and both will be routed to the first output link of the AWGR in stage 1 (for $[s_0,0]$, *, $[d_0,0]$, it is the first output link of $s_0$). If flow $([s_0,0],*,[d_0,0])$ can be switched to the first input link of AWGR $d_0$ in stage 3, it will, be routed to output port $[d_0,0]$ the same way flow (0,*,0) is routed to output port 0 in FIG. 3. The slice number of flow $([s_0,0],*,[d_0,0])$ is also computed the same way as before and equals to 0. Thus this flow is sent to the 0th optical space switch. Transmitting the flow $([s_0, 0],*, [d_0,0])$ from $s_0$ to $d_0$ is a task performed by the $0^{th}$ space switch. The design principle of an ASA switch can be summarized as follows;

Wavelength routing (in stage 1 and 3) is based on the member field, and space switching (in stage 2) is based on the group field.

Based on this principle, we can compare slice 0 in FIG. 3 and slice 0 in the ASA switch. Slice 0 in FIG. 3 contains five flows:

$$(0,*,0),(1,*,4),(2*,3),(3,*,2),(4,*,1). \quad (5)$$

Figure 6:
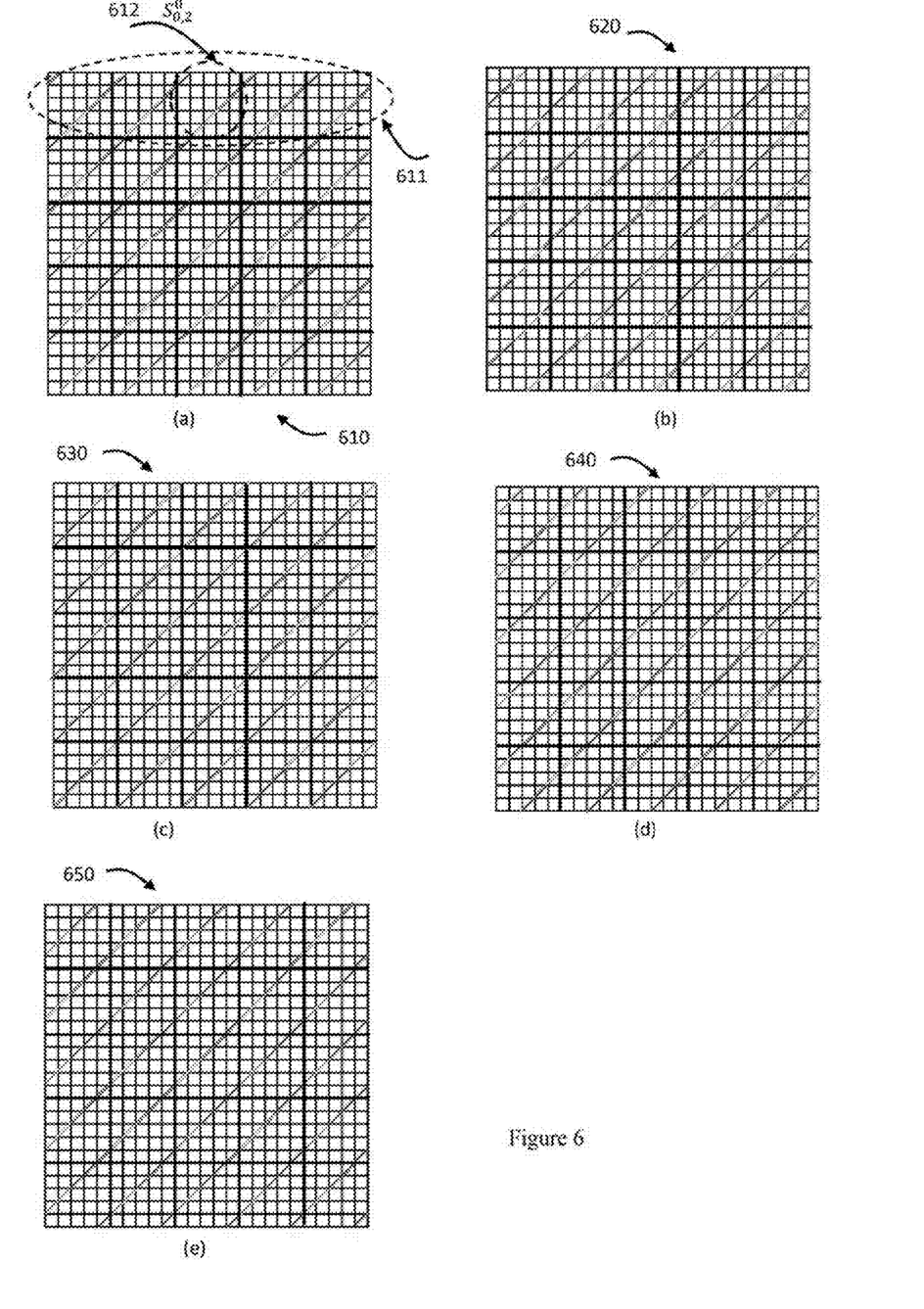
FIG. 6 is a diagram illustrating the fact that a total of $N^4$ flows exist in the presented optical switching system, and they can be divided into N slices and each slice contains $N^3$ flows. Different colors represent different wavelengths used for different flows.

Slice 0 of the ASA switch, in FIG. 5 is described by the following formula:

$$([s_0,0],*,[d_0,0]),*,([s_1,1]*,[d_1,4]),([s_2,2],*,[d_2,3]),([s_3,3],*,[d_3,2]),([s_4 4],*,[d_4,1]), \quad (6)$$

where $0\leq s_j, d_j\leq 4$ (N=5 in this example). (6) contains slice 0s from AWGRs of stage 1 and slice0s of the ARGRs in stage 3. There are 125 flows in (6) (flows 610 in FIG. 6a). Note that in FIG. 6, different colors represent different wavelengths used for different flows. These flows will be switched by the $0^{th}$ optical space switch. If we set all $s_j$ in (6) to 0, then we have $$([0,0],*,[d_0,0]),([0,1],*,[0,4]),([0,2],*,[d_2,3]),([0,3],*,[d_3,2]),([0,4],*,[d_4,1]). \quad (7)$$

These flows are generated by the input ports attached to AWGR 0 in stage 1. Since they can be destined for output ports of any AWGR in stage 3, there are twenty-five such flows (i.e. flows 611), represented by the first five rows in FIG. 6a. If we further set all d, to 2 in (7), then we have $$([0,0],*,[2,0]),([0,1],*,[2,4]),([0,2]),([0,3],*,[2,2])([0,4],*,[2,1]). \quad (8)$$

These flows are generated from the input ports connected to AWGR 0 in stage-1 and destined for the output ports connected to AWGR 2 in stage-3. (8) contains only five flows (i.e. flows 612).

Slice j in an ASA switch can be defined in the same way and its flows pass through the jth output links of the AWGRs in stage-1 and arriving at the jth input links of the AWGRs in stage-3 (see flows 620, 630, 640, 650 in FIG. 6b-e). Let $S_{g_s,g_d}^k$ represent the slice-k flows generated from the input ports attached to AWGR $g_s$ in stage-1 and destined for the output ports attached to AWGR $g_d$ in stage-3. For example, $S_{0,1}^0$ represents flows 612. The following property will be used later in the design of the scheduler of an ASA switch.

Property 5. All flows of $S_{g_s,g_d}^k$ different wavelengths.
Proof. Same as Property 3. ∎

The Electronic Scheduler

The ASA scheduler consists of two stages of scheduling devices interconnected with a topology (see FIG. 7) similar to the topology of the first two-stages of the switching fabric. Each scheduling device of the second scheduling stage controls the states of one optical space switch of the switching fabric.

Figure 7:
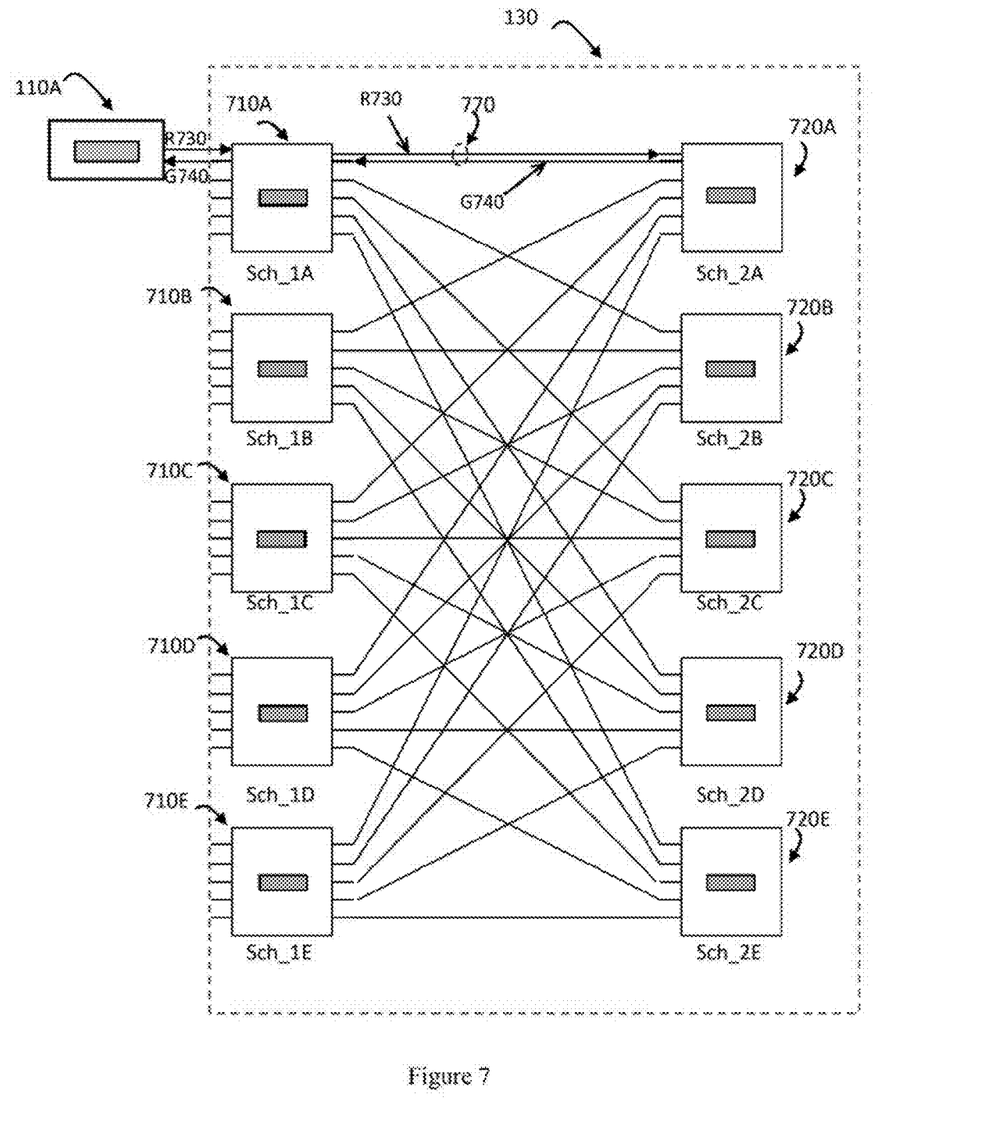
FIG. 7 is a diagram illustrating the scheduler of an ASA switch and its topology.

Each wire (e.g. 770) in FIG. 7 consists of two optical fibers: one for each direction. One fiber is used for sending request tokens (e.g. R730), and the other for returning grant tokens (e.g. G740). Upon receiving a new packet, an input port (e.g. 110A) sends a request token. (e.g. R730) to a scheduling device (e.g. 710A) of stage 1 to which it is attached. The request token carries the source port and destination port addresses of the packet. The scheduling device of the first stage forwards the request token to a scheduling device of the second stage (e.g. 720A) according to the slice number of the request token, which can be computed as follows. Let $[g_s, m_s]$ and $[g_d, m_d]$ be the source and the destination port addresses inside the request token. From (5), we have $$\text{Slice} = (m_s + w) \bmod N. \quad (9)$$

Note that w in (9) can be derived from (4), i.e. $(m_s+2w) \bmod N = m_d$. After scheduling is performed, the scheduling device of the second stage will return a grant token (e.g. G740) to the scheduling device of the first-stage, which passes the grant token back to the input port. The second-stage scheduling device also uses the scheduling results to configure the optical space switch under its control.

Figure 8:
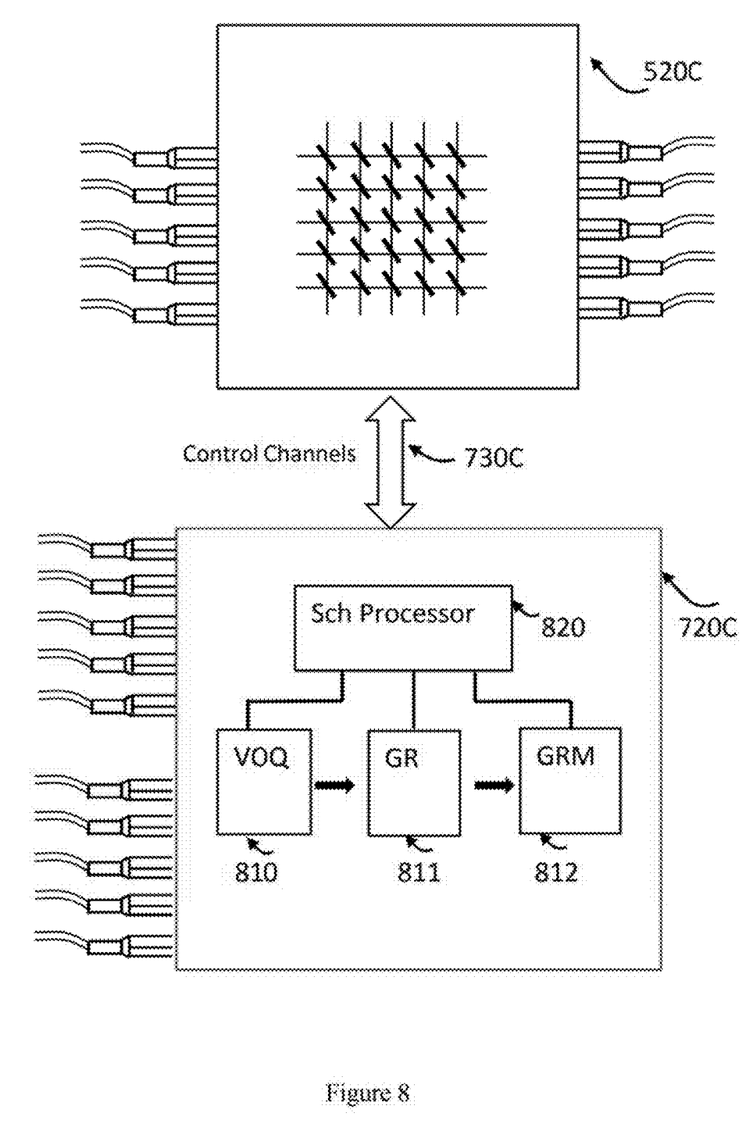
FIG. 8 is an exemplary embodiment of a second-stage scheduling device in the scheduler. Each controls one optical space switch in the switching fabric.

Note that scheduling is performed, on a slot by slot basis (each slot corresponds to one cell transmission time). A scheduling device of the second stage (e.g. 720C in FIG. 8) records received request tokens in VOQ (virtual output queue) counters, one for each flow. An ASA switch has $N^2$ ports and $N^4$ flows. But an optical space switch in the ASA architecture only handles one slice of all flows. Thus the total number of VOQ counters in a scheduling device of the second scheduling stage is $N^3$, not $N^4$ (see FIG. 5). In addition to VOQ counters, a scheduling device of the second stage also maintains GR (group request) counters, denoted by $GR(g_s, g_d)$, $GR(g_s, g_d)$ records the total requests from input ports attached to AWGR $g_s$ of stage 1 to output, ports attached to AWGR $g_d$ of stage 3. That is, $GR(g_s, g_d) = \Sigma_{ms,md} VOQ([g_s,m_s], [g_d,m_d])$. In other words, $GR(g_s, g_d)$ of the kth scheduling device in stage 2 records the total number of request tokens of flows $S_{g_s,g_d}^k$. From $GR(g_s, g_d)$, we can construct a Group Request Map (GRM); if $GR(g_s,g_d)>0$, then $GRM(g_s,g_d)=1$; otherwise, $GRM(g_s,g_d)=0$. An example is given in FIG. 9 where shaded cells mean the corresponding VOQ counters>0. FIG. 9b shows the corresponding GRM( ). Based on the GRM( ), the scheduler processor 820 of 720C executes a matching algorithm to maximize the number of connections that can be set up in a given slot through the optical space switch 520C which is under die control of 720C.

Figure 9A:
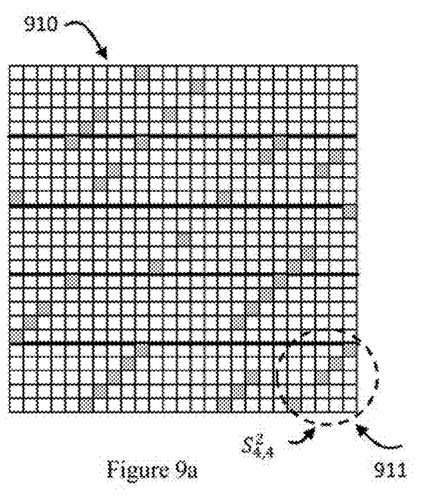
FIG. 9a an example of VOQ counter status in a second-stage scheduling device in the scheduler. Shaded, cells means the corresponding VOQ counters>0.
Figure 9B:
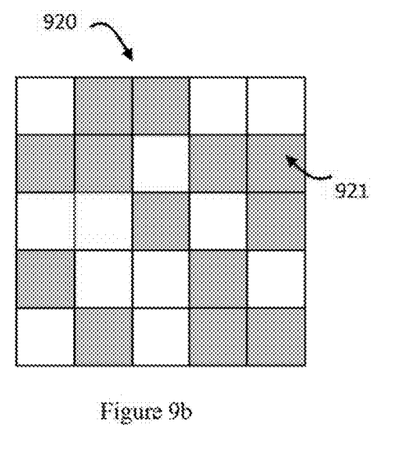
FIG. 9b is an example of GRM (group request map).
Figure 9C:
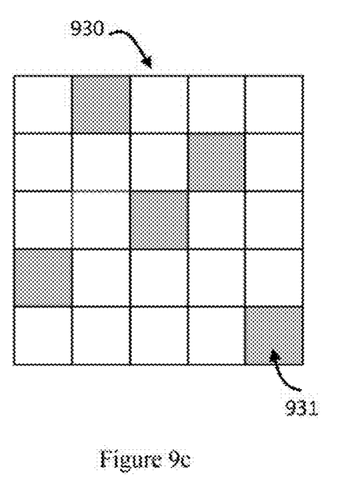
FIG. 9c is an example of group matching result based on the GRM in FIG. 9b. Shaded cells represent the connections to be set up in the optical space switch controlled by the scheduling device in a given slot.

FIG. 9 shows an example of the matching algorithm. The shaded cells in 910 represent non-zero VOQ counters. 920 is the derived GRM( ). A shaded cell (e.g. 921) in 920 means that the corresponding $GR(g_s,g_d)$ counter is >0. Using 920, scheduling processor 820 will execute a matching algorithm. The matching result (e.g. 930) represents the interconnection pattern of the optical space switch 520C in that slot. A shaded cell in 930 represents one connection through the optical space switch 520C. For example, cell 931 represents a connection between AWGR4 in stage-1 and AWGR4 in stage-3. By Property 5, grants can be issued to all flows in 911 (i.e. $S_{4,4}^2$).

In the embodiment presented above, an input port is equipped with N fixed-wavelength transmitters. We can certainly use a smaller number of transmitters. Then the transmitters seed to be tunable. A first stage scheduler will select at most t grants, where t is the number of transmitters, and send them back to port processors.

The following two properties show that all scheduling devices of the second stage can work independently without causing collisions inside an ASA switch.

Property 6. Suppose that two flows $(i_1, w_1, o_1)$ and $(i_2, w_2, o_2)$ belong to two different slices in an ASA switch. If $o_1 = o_2$, then $w_1 \neq w_2$.

Proof. See the proof of Property 4. ∎

Property 7. In an ASA switch, the scheduling devices of the second scheduling stage can work independently without causing same-wavelength packet collisions on a link.

Proof. Two grants issued by two different scheduling devices of the second stage belong to different slices and the granted packets will use different paths and different space switches. The only way two granted packets can block each other is when the two granted packets use the same wavelength and are destined for the same output port. But according to Property 6, this cannot happen. ∎

Input and Output Port

Figure 10A:
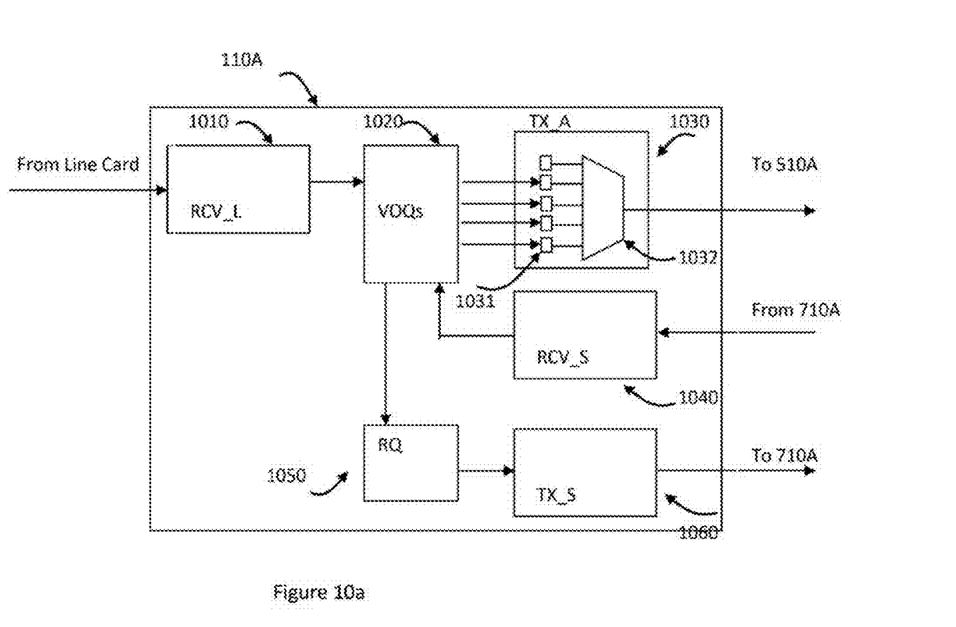
FIG. 10a is an exemplary embodiment of an input port processor.
Figure 10B:
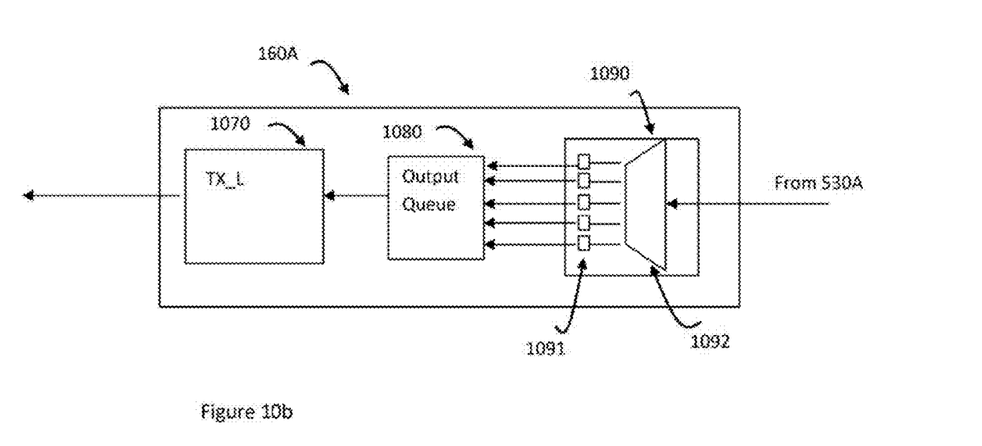
FIG. 10b is an exemplary embodiment of an output port processor.

FIG. 10a illustrates an exemplary, non-limiting embodiment of input port 110A. When receiver 1010 receives a packet from a line card, it stores the packet in VOQ 1020 based on the destination output port's address. A request token will be generated and stored in the request queue (RQ) 1050. Transmitter 1060 will send it out to scheduling device 710A of the first scheduling stage. When receiver 1040 receives a grant, it will inform 1020 and the corresponding packet will be retrieved from 1020. Based on the wavelength used for the packet, transmitter 1030 will send it out by using the laser (e.g. 1031) of the computed wavelength. Wavelength multiplexer 1032 will multiplex many packets of different wavelengths and send them out through the same fiber in one cell time. FIG. 10b illustrates an exemplary, non-limiting embodiment of output port 160A. Multiple cells with different wavelengths can arrive in one cell time at receiver 1090, de-multiplexer 1092 separates the packets and the detector array 1091 converts them into electronic signals. These packets are stored in a buffer 1080 before they are sent to the line card by transmitter 1070.

Methodologies

Figure 11:
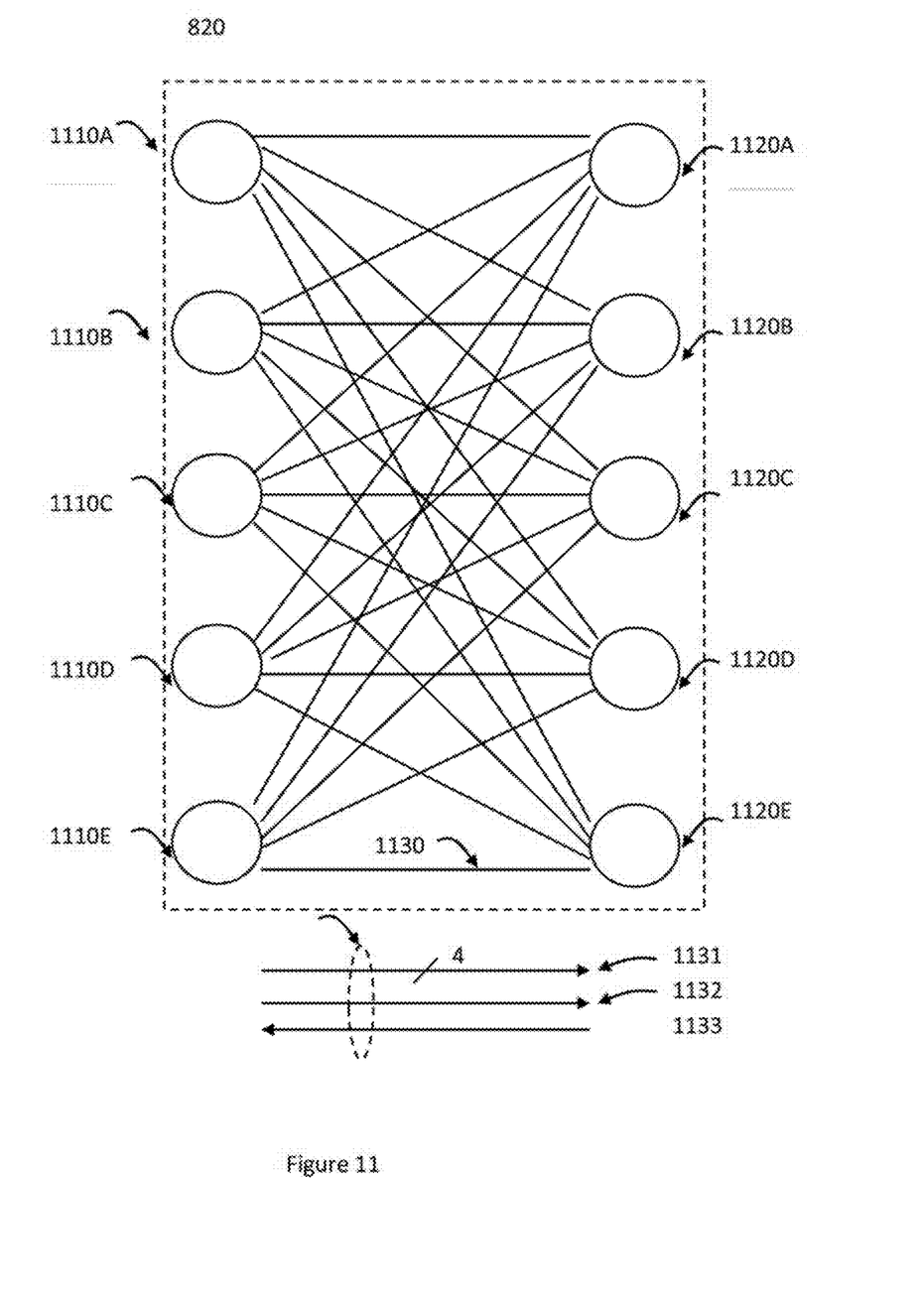
FIG. 11 is an exemplary implementation of the matching algorithm in the scheduling processor of a second-stage scheduling device.

FIG. 11 presents a diagram illustrating an exemplary, non-limiting embodiment, of the matching algorithm executed by a second-stage scheduling device of the scheduler. Inside the scheduling device 720, there is a scheduling processor 820 comprising N request controllers (RCs) (i.e. 1110A-E) and N grant controllers (GCs) (i.e. 1120A-E). An RC can access a row of the GRM( ) and the associated $GR(g_s, g_d)$ counters. Each row represents the requests from one AWGR of stage 1, but destined for different AWGRs of stage 3 in the switching fabric. A GC decides which request from the GRs will be granted by sending back a grant signal. Note that request and grant signals are sent inside the scheduling processor 302.

Each link (e.g. 1130) connecting an RC and a GC in FIG. 11 contains one wire (e.g. 1132) for sending a request, four wires (e.g. 1131) for sending a quantized value of the GR counter associated with the request, and one wire (e.g. 1133) for returning a grant signal. The quantized counter value serves as the priority level of the request. An RC selects the largest $GR(g_s, g_d)$ and launch a request for this group. A GC selects the request with the largest quantized counter value. Also, there is a pointer in each RC and GC for breaking ties. The request (or grant) pointers are initialized to different values when the system is turned on and will increment by one after scheduling is done for a slot. To get a better performance, multiple iterations of the same matching algorithm can be performed during each slot. After scheduling is done for a given slot, the scheduling device 720 uses the scheduling results to configure optical space switch 520C, which is under its control. A set of control signals is sent through link 730C to control the states of the switching elements of 520C.

Figure 12:
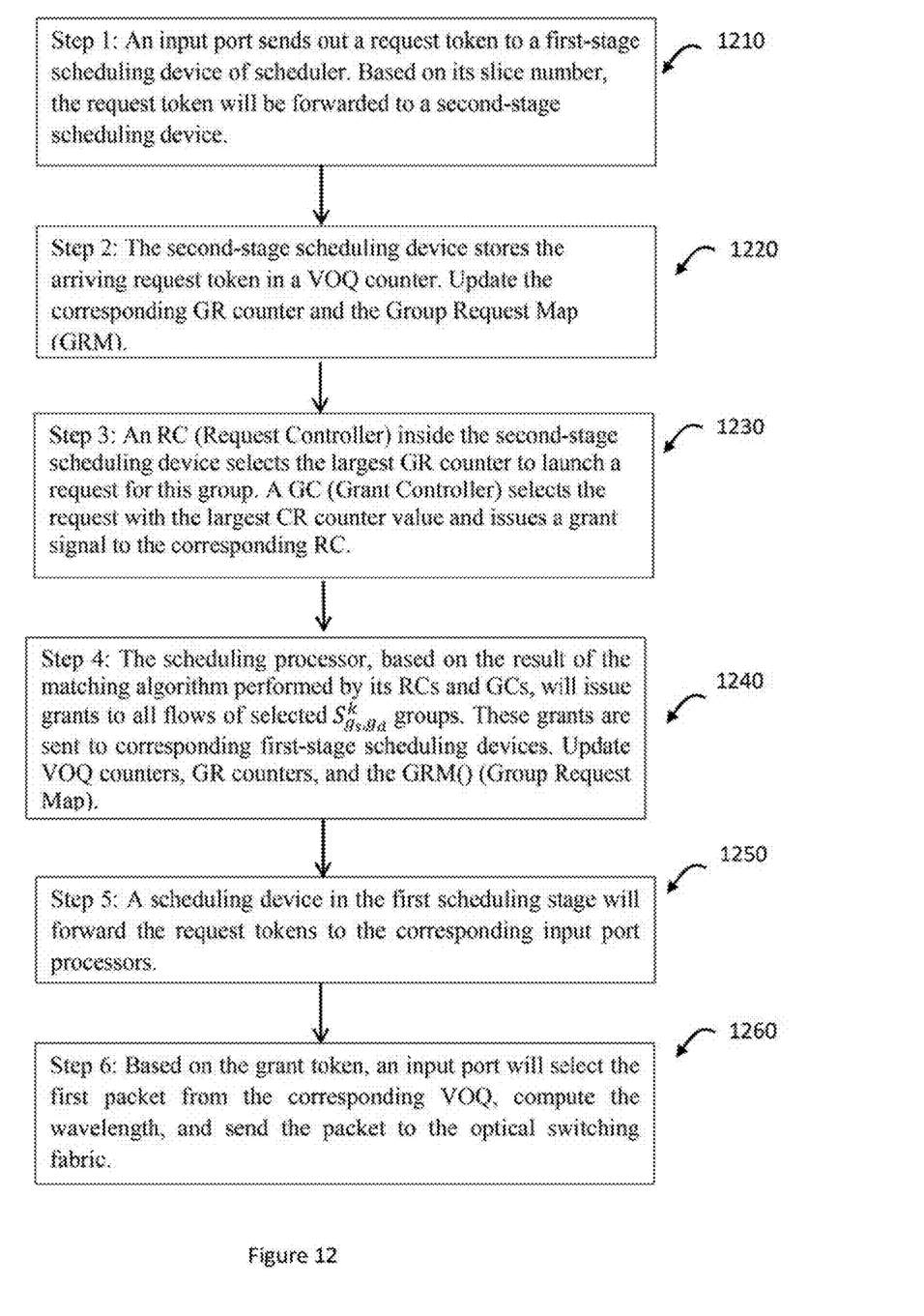
FIG. 12 is a flow diagram illustrating an exemplary process from sending request tokens by input ports to receiving grant tokens and cell scheduling transmissions by input ports.

FIG. 12 presents a flow diagram illustrating the major events from the arrival of a packet till the transmission of the packet to the optical switching fabric.

At 1210, an input port, sends out a request token, to a first-stage scheduling device of the scheduler. Based on its slice number, the request token will be forwarded to a second-stage scheduling device of the scheduler.

At 1220, the second-stage scheduling device stores the arriving request token in a VOQ counter and updates the corresponding OR counter and the Group Request Map (GRM).

At 1230, an RC (Request Controller) inside the second-stage scheduling device selects the largest GR counter to launch a request. A GC (Grant Controller) selects the request with the largest GR counter value and issues a grant signal to the corresponding RC.

At 1240, the second-stage scheduling device, based on the result of the matching algorithm performed by its RCs and GCs, will issue grants to all flows of selected $S_{g_s,g_d}^k$ groups during matching. These grants are sent to corresponding first-stage scheduling devices. It also updates its VOQ counters, GR counters, and the GRM( ) (Group Request Map).

At 1250, the first-stage scheduling device will forward the received request token to the input port.

At 1260, based on the grant token, the input port will select the first packet from the corresponding VOQ, compute the wavelength, and send the packet to the optical, switching fabric.

What is claimed is:

1. An optical switching system comprising:
    an optical switching fabric comprising
        a first switching stage comprising a plurality of N×N (N input ports and N output ports) AWGRs (arrayed wavelength grating routers) for cyclically routing component wavelengths, each component wavelength carrying a data packet, of first WDM signals received from external processors and sending first routed WDM signals to a second switching stage;
        the second switching stage comprising a plurality of N×N optical space switches configured to switch the first routed WDM signals to a third switching stage; and
        the third switching stage comprising a plurality of N×N AWGRs for cyclically routing component wavelengths of second WDM signals, received from the second stage, to output ports of the plurality of AWGRs of the third stage; and
    an electronic scheduler for processing request packets from the external processors, returning grant packets to the external processors, and configuring optical space switches of the second switching stage.

2. The system of claim 1, wherein N is an odd integer.

3. The system of claim 2, wherein the second space switching stage comprises N optical space switches numbered from 0 to N−1.

4. The system of claim 3, wherein the first and the third switching stage comprise m AWGRs numbered from 0 to m−1, and m≤N.

5. The system of claim 4, wherein address of each input port of the first switching stage is represented by a two tuple (group, member), 0≤group≤m−1, 0≤member≤N−1, group being an AWGR number in the first switching stage and member being an input port number of said AWGR.

6. The system of claim 5, wherein address of each output port of the third switching stage is represented by a two tuple (group, member), 0≤group≤(m−1), and 0≤member≤N−1, group being an AWGR number in the third switching stage and member being an output port of said AWGR.

7. The system of claim 6, wherein external processor connected to input port $(g_1,m_1)$, $g_1$ being a group value and $m_1$ a member value, of the first switching stage uses wavelength w to transmit data packets destined for external processor connected to output port $(g_2,m_2)$, $g_2$ being a group value and $m_2$ a member value, of the third switching stage, wherein w is computed from $$m_2=(m_1+2w) \bmod N,$$

and slice number of said data packets is computed from $$\text{slice number}=(m_1+w) \bmod N.$$

8. The system of claim 7, wherein the electronic scheduler comprises
    a first scheduling stage comprising a plurality of N×N scheduling devices for distributing request packets from the external processors to a second scheduling stage and returning grant packets, received from the second scheduling stage, to the external processors; and
    the second scheduling stage comprising N scheduling devices, each being associated with one of the N optical space switches of the second switching stage, for processing the request packets received from the first scheduling stage, configuring the optical space switches of the second switching stage, and sending the grant packets to the first scheduling stage.

9. The systems of claim 8, wherein the external processors send a request packet for each data packet to the first scheduling stage, said request packet carrying (input port address, output port address) of the each data packet.

10. The system of claim 9, wherein the first scheduling stage forwards said request packet to a first scheduling device of the second scheduling stage based on slice number of the each data packet.

11. The system of claim 10, wherein the first scheduling device of the second scheduling stage comprises a plurality of counters, at least one counter being used to record requests for (input port, output port) pair in said request packet.

12. The system of claim 11, wherein the first scheduling device of the second scheduling stage uses values of the plurality of counters to select a plurality of (input port, output port) pairs and send grant packets, each carrying an (input port address, output port address) pair, to the first scheduling stage which returns the grant packets to the external processors, and use the selection result to configure an optical space switch associated with the first scheduling device of the second scheduling stage.

* * * * *